United States Patent
Ejbeh-Agby

(10) Patent No.: US 12,485,715 B2
(45) Date of Patent: Dec. 2, 2025

(54) STRUT WITH INTEGRATED AIR SPRING

(71) Applicant: Rivian IP Holdings, LLC, Plymouth, MI (US)

(72) Inventor: Joshua Naif Ejbeh-Agby, Dexter, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 434 days.

(21) Appl. No.: 18/091,529

(22) Filed: Dec. 30, 2022

(65) Prior Publication Data

US 2024/0217294 A1     Jul. 4, 2024

(51) Int. Cl.
| | |
|---|---|
| B60G 15/12 | (2006.01) |
| F16F 9/084 | (2006.01) |
| F16F 9/32 | (2006.01) |
| F16F 9/36 | (2006.01) |
| F16F 9/43 | (2006.01) |
| F16F 9/54 | (2006.01) |

(52) U.S. Cl.
CPC .............. *B60G 15/12* (2013.01); *F16F 9/084* (2013.01); *F16F 9/3271* (2013.01); *F16F 9/369* (2013.01); *F16F 9/435* (2013.01); *F16F 9/54* (2013.01); *B60G 2202/314* (2013.01); *B60G 2204/129* (2013.01); *B60G 2206/91* (2013.01); *B60G 2800/162* (2013.01); *F16F 2226/04* (2013.01); *F16F 2232/08* (2013.01); *F16F 2234/02* (2013.01)

(58) Field of Classification Search
CPC ........ B60G 15/12–14; B60G 2202/314; B60G 2204/129; B60G 2206/91; B60G 2800/162; F16F 9/02–057; F16F 9/084; F16F 9/3271; F16F 9/369; F16F 9/435; F16F 9/54; F16F 2226/04; F16F 2232/08; F16F 2234/02

See application file for complete search history.

(56) References Cited

U.S. PATENT DOCUMENTS

| | | | | |
|---|---|---|---|---|
| 3,049,360 | A * | 8/1962 | Allinquant | B60G 15/12 267/64.16 |
| 4,828,232 | A * | 5/1989 | Harrod | F16F 9/084 280/124.155 |
| 8,371,562 | B2 * | 2/2013 | Knevels | F16F 15/022 267/64.27 |
| 2004/0222576 | A1 * | 11/2004 | Oldenettel | F16F 9/361 267/64.19 |
| 2022/0082148 | A1 * | 3/2022 | Ortuno Ayuso | B62K 25/286 |

FOREIGN PATENT DOCUMENTS

| | | | | |
|---|---|---|---|---|
| DE | 102011055573 A1 * | 5/2013 | | B60G 11/27 |
| EP | 0000287 A1 * | 1/1979 | | B60G 11/27 |

* cited by examiner

*Primary Examiner* — David R Morris
(74) *Attorney, Agent, or Firm* — Patterson + Sheridan, LLP

(57) ABSTRACT

An inverted air spring strut includes an inverted strut and an air spring. The air spring substantially encloses the inverted strut and is connects to the inverted strut towards a top side of the inverted strut. The air spring may provide suspension, isolation, and/or actuation. A strut head of the inverted strut penetrates a top side of the air spring while a strut rod penetrates a bottom side of the air spring. The strut head of the strut may include a compression fluid connection and a rebound fluid connection. In an aspect, lines allow fluid to flow to and from the inverted strut to an external fluid control system.

18 Claims, 7 Drawing Sheets

STRUT WITH INTEGRATED AIR SPRING

INTRODUCTION

The present disclosure is directed to an inverted strut integrated with an air spring through use of a sealing compliance bushing.

SUMMARY

Embodiments described herein are directed to an inverted strut with an integrated air spring. A sealing compliance bushing is used to form a top seal for the air spring that allows the inverted strut to penetrate the top of the air spring. The inverted strut includes connections for external fluid flow located at the top of the inverted strut. For simplicity, the inverted strut with an integrated air spring may be described as an inverted air spring strut, or inverted air spring strut assembly, throughout this disclosure. As used herein, the term "inverted" means the strut rod penetrates the bottom of the strut body and is facing downward towards the driving surface when installed in a vehicle. The inverted orientation contrasts with a rod up orientation (not shown) where the strut rod exits the top (when installed) of the strut body and connects to a vehicle chassis. As used herein, the terms top and bottom are used to describe components from the perspective of the inverted air spring strut installed on a vehicle. The inverted air spring strut is installed in a generally perpendicular orientation to the driving surface. Accordingly, the term "bottom" refers to a side of the component nearer to the driving surface. Similarly, the term "top" refers to a side of the component further from the driving surface.

The inverted air spring strut includes the inverted strut and the air spring. The air spring substantially encloses the inverted strut and is connected to the inverted strut towards a top side of the inverted strut. The air spring is connected to both the top and bottom of the strut—one interface at top, one and at the bottom. The air spring is connected (e.g., sleeve crimp) to a top mount housing at the top and a piston at the bottom. The top mount housing then interfaces with the sealing bushing, which in turn interfaces with the strut. At the bottom, the piston interfaces with the strut rod. The air spring may provide suspension, isolation, and/or actuation. A strut head of the inverted strut penetrates a top side of the air spring while a strut rod penetrates a bottom side of the air spring. The strut head of the strut may include a compression fluid connection and a rebound fluid connection. Lines allow fluid to flow to and from the inverted strut to an external fluid control system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Illustrative embodiments are described in detail below with reference to the attached drawing figures, wherein.

DETAILED DESCRIPTION

Overview

Figure 1:
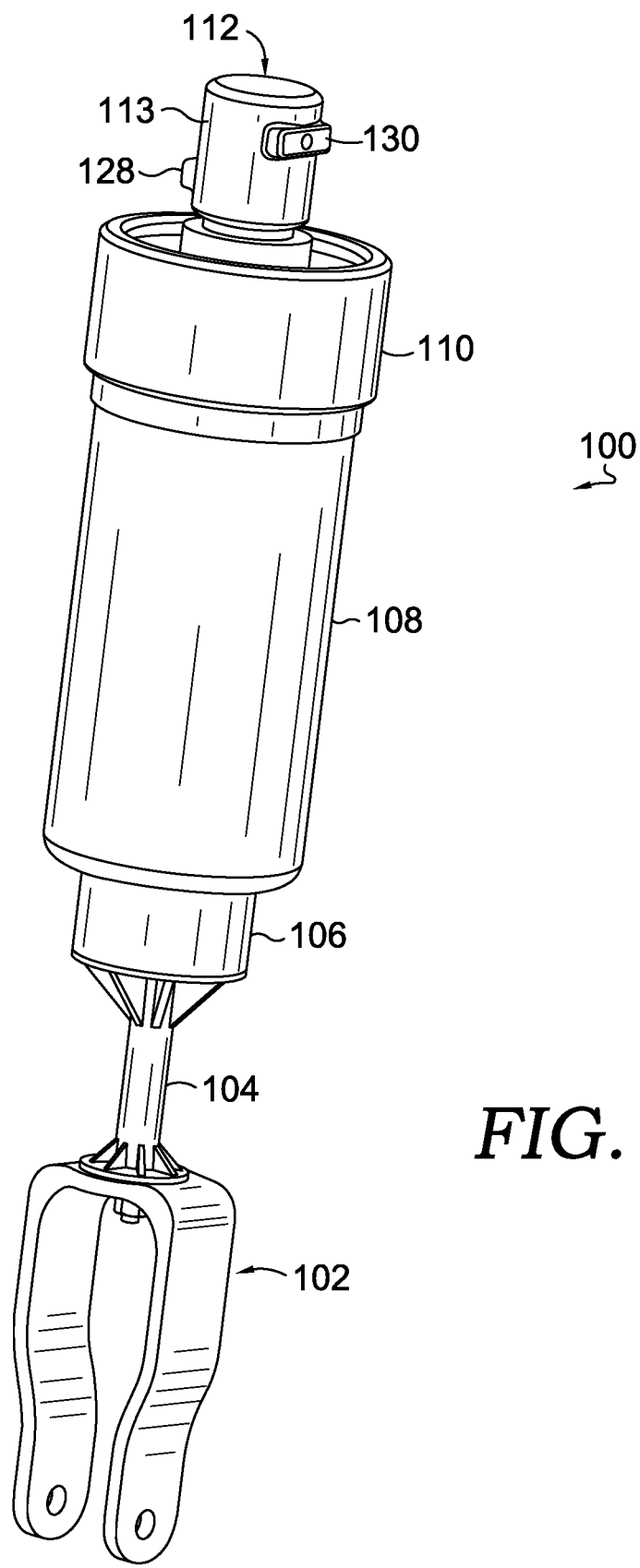
FIG. 1 is a perspective view of an air spring strut, in accordance with various embodiments.

Embodiments described herein are directed to an inverted strut with an integrated air spring. A sealing compliance bushing is used to form a top seal for the air spring that allows the inverted strut to penetrate the top of the air spring. The inverted strut includes connections for external fluid flow located at the top of the inverted strut. For simplicity, the inverted strut with an integrated air spring may be described as an inverted air spring strut throughout this disclosure. As used herein, the term "inverted" means the strut rod penetrates the bottom of the strut body and is facing downward towards the driving surface when installed in a vehicle. The inverted orientation contrasts with a rod up orientation (not shown) where the strut rod exits the top (when installed) of the strut body and connects to a vehicle chassis. As used herein, the terms top and bottom are used to describe components from the perspective of the inverted air spring strut installed on a vehicle. The inverted air spring strut is installed in a generally perpendicular orientation to the driving surface. Accordingly, the term "bottom" refers to a side of the component nearer to the driving surface. Similarly, the term "top" refers to a side of the component further from the driving surface.

The inverted air spring strut includes the inverted strut and the air spring. The air spring substantially encloses the inverted strut and is connected to the inverted strut towards a top side of the inverted strut. The air spring is connected to both the top and bottom of the strut—one interface at top, one and at the bottom. The air spring is connected (e.g., sleeve crimp) to a top mount housing at the top and a piston at the bottom. The top mount housing then interfaces with the sealing bushing, which in turn interfaces with the strut. At the bottom, the piston interfaces with the strut rod. The air spring may provide suspension, isolation, and/or actuation. A strut head of the inverted strut penetrates a top side of the air spring while a strut rod penetrates a bottom side of the air spring. The strut head of the strut may include a compression fluid connection and a rebound fluid connection. Lines allow fluid to flow to and from the inverted strut to an external fluid control system.

The inverted orientation of the strut allows the fluid connections to be located near the chassis, rather than near the wheel. This location significantly reduces the amount of movement or travel experienced by the fluid connections and connected lines. For example, in a rod up orientation, the fluid connections may move 50 mm, 100 mm, 200 mm, or more relative to the chassis during operation of the vehicle. In contrast, with the inverted air spring strut, the fluid connections may move around 10-15 mm relative to the chassis during operation of the same vehicle. The actual amount of movement depends on suspension geometry and characteristics. Reducing the movement of the fluid connections may reduce wear and tear on the fluid lines used to connect the strut to the external damper. This may enable lighter service lines to be used, while maintaining the same or better reliability. Further, the fluid lines connecting to a top of the inverted air spring strut may be less exposed to rocks, stones, and other objects than fluid lines connecting to a non-inverted (e.g. rod up) strut near the wheel.

The sealing compliance bushing is able to allow movement while maintaining a seal at the top side of the air spring. In examples where a fluid connection is not located at the top of the inverted air spring strut, then a solid cap could be used instead of the sealing compliance bushing. The sealing compliance bushing is installed between an interior wall of the air spring and an exterior wall of the inverted strut. This allows the top of the inverted strut to penetrate the sealing compliance bushing to enable the fluid connections to be located at the top of the air spring strut and outside of the air spring.

FIGS. 1-7 illustrate one embodiment of an inverted air spring strut that uses a non-through rod strut. A non-thru rod strut has a rod on one side of the damper piston, and not on the other, resulting in asymmetric hydraulic areas. A through-rod strut variation could be used with embodiments of the technology described herein, and is shown in FIG. 8. The embodiment shown does not include damping valves, instead using an external damping mechanism/block (not described) connected to the inverted strut with lines. The invention is not limited for use with an external damping mechanism. As an alternative, the damper function could be integrated into the inverted strut in various arrangements. The sealing compliance bushing and associated assembly of the sealing compliance bushing, air spring, and inverted strut forms a suitable airtight connection that enables the inverted arrangement of the air spring with the inverted strut.

Turning now to FIG. 1, a perspective view of an inverted strut with an integrated air spring is provided in accordance with various embodiments. For simplicity, the inverted strut with an integrated air spring may be described as an inverted air spring strut 100 throughout this disclosure. The inverted air spring strut 100 includes an air spring 108 and an inverted strut 112. The air spring 108 encloses a portion of the body of the inverted strut 112, such that the strut head 113 penetrates the top mount housing 110 of the air spring 108. As will be shown in more detail subsequently, a sealing compliance bushing is used to create a seal between the outside surface of the inverted strut 112 and the inside surface of the top mount housing 110 of the air spring 108.

The air spring 108 includes a moveable air spring piston 106. A clevis 102 is connected to the bottom of a strut rod (e.g., strut rod 138 in FIG. 2) that passes through the air spring piston 106. The strut rod is not visible in FIG. 1 because it runs through the spring seat support 104. The clevis 102 may be connected directly or indirectly to a lower control arm of a wheel assembly. Other joints, connectors, or couplings (e.g., ball joints, universal joints) may be used in addition, or in alterative to the clevis joint 102.

The strut head 113 includes a rebound-chamber fluid connection 128 and a compression-chamber fluid connection 130. The rebound-chamber fluid connection 128 allows fluid to flow through a line to and from the strut's rebound chamber and an external fluid control system. The compression-chamber fluid connection 130 allows fluid to flow through a line to and from the strut's compression chamber and the fluid control system.

Figure 2:
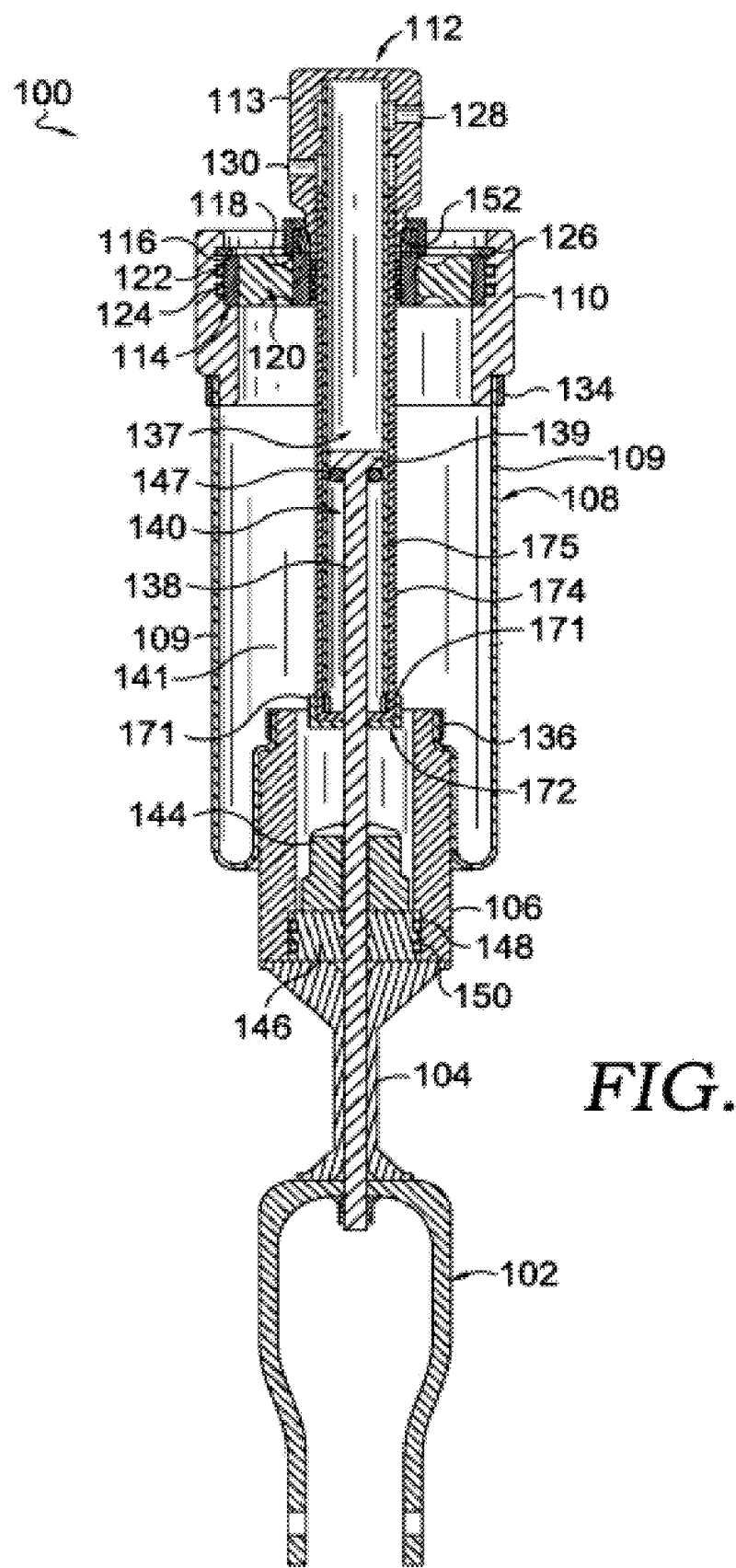
FIG. 2 is a side view in cross-section of an inverted air spring strut, in accordance with various embodiments.

Turning now to FIG. 2, a side view in cross-section of an inverted air spring strut 100 is provided in accordance with various embodiments. The inverted strut includes a compression chamber 137 and a rebound chamber 140 separated by the sealed damper piston 139. In a sealed damper piston, the dampening occurs outside of the inverted strut 112 in an external fluid control system (not shown). An interior cylinder 175 forms the inner surface of the compression chamber 137 and the rebound chamber 140. Strut fluid may pass through a lower opening 171 into a plenum space bounded by the outward facing surface of the interior cylinder 175 and an interior facing surface of an exterior cylinder 174. In an embodiment, the lower opening 171 may be created with cutouts radially that allow the fluid to pass. In aspects, there may be an interface between the end of the interior cylinder 175 and the end of the exterior cylinder 174. The strut fluid may enter or exit the plenum space through the compression-chamber fluid connection 130. The strut rod 138 penetrates through a bottom surface (e.g., the bottom cap 172) of the inverted strut 112. The strut rod may move up and down relative to the bottom cap 172 of the inverted strut 112. Bottom cap 172 may be coupled to exterior cylinder 174, or formed with exterior cylinder 174 as a single piece.

The exterior side of the air spring 108, which may form an approximately cylindrical shape when pressurized, is formed by the air spring membrane 109. The air spring membrane 109 may be a textile-reinforced rubber. An upper crimp ring 134 attaches the air spring membrane 109 to the top mount housing 110. A lower crimp ring 136 attaches the air spring membrane 109 to the air spring piston 106.

A piston-sealing cap 146 forms a lower boundary of the air spring's air chamber 141. The outer seal between the exterior-facing surface of the piston-sealing cap 146 and an interior surface of the air spring piston 106 is formed by an upper O-ring 148 and a lower O-ring 150. Three O-rings (upper-interior O-ring 540, middle-interior O-ring 541, and lower-interior O-ring 542 (shown in FIG. 5)) form an interior seal between the exterior surface of the strut rod 138 and an interior surface of an orifice through a center of the piston-sealing cap 146. A jounce bumper 144 is located above the piston-sealing cap 146. The top of the air spring's air chamber 141 is formed by the sealing compliance bushing 120. The sealing compliance bushing is described in more detail subsequently. Through not shown, the spring seat support 104 may be attached to the bottom of the air spring piston 106 with bolts or screws.

Figure 3:
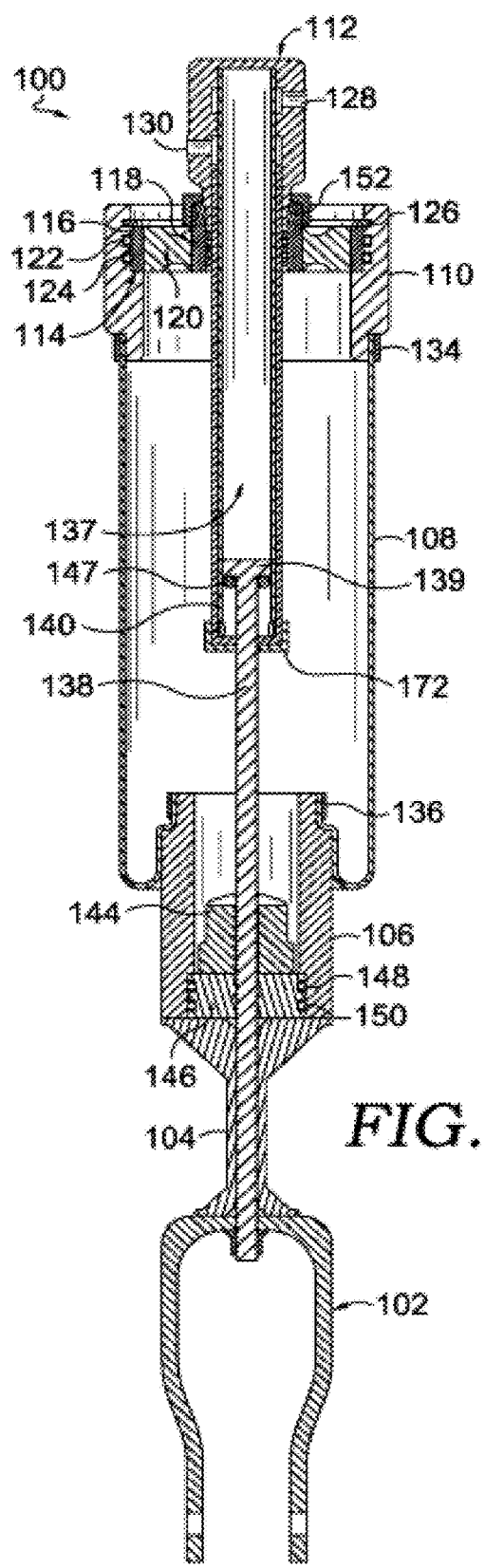
FIG. 3 is a side view in cross-section of an inverted air spring strut in an extended position, in accordance with various embodiments.
Figure 4:
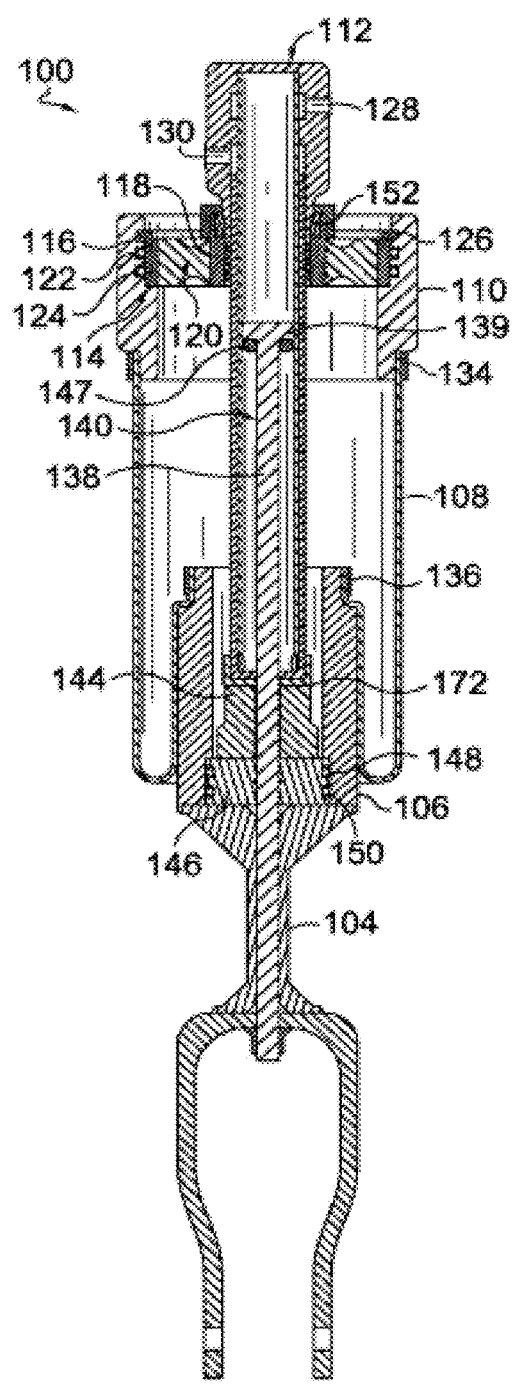
FIG. 4 is a side view in cross-section of an inverted air spring strut in a compressed position, in accordance with various embodiments.

Turning now to FIG. 3 and FIG. 4, movement of the damper piston 139 and air spring piston 106 is illustrated. FIG. 3 is a side view in cross-section of an inverted air spring strut 100 in an extended position. The movement is also visible relative to FIG. 2, which shows the inverted air spring strut 100 in a neutral position. The inverted air spring strut 100 elongates to the extended position. In the extended position, the damper piston 139 moves towards the bottom of the inverted strut 112. A rebound stop 147 prevents a bottom side of the damper piston 139 from contacting a top side of the bottom cap 172. The strut rod 138 slides through the bottom cap 172 of the inverted strut 112, which increases a distance between the bottom cap 172 of the inverted strut 112 and the air spring piston 106. This movement of the damper piston 139 increases the volume of the compression chamber 137 and decreases the volume of the rebound chamber 140. In response to the changing volumes, strut fluid flows out of the rebound chamber 140 through the lower opening 171 and then through the rebound-chamber fluid connection 128 to an external fluid control system. Strut fluid flows from the external fluid control system into the compression chamber 137 through the compression-chamber fluid connection 130. Dampening occurs through resistance to fluid movement provided by the external fluid control system.

In contrast to FIG. 3, FIG. 4 is a side view in cross-section of an inverted air spring strut 100 in a compressed position. The inverted air spring strut 100 shortens to the compressed position. In the compressed position, the damper piston 139 moves towards the top of the inverted strut 112. The strut rod 138 slides through the bottom cap 172 of the inverted strut 112, which decreases a distance between the bottom cap 172 of the inverted strut 112 and the air spring piston 106. The downward movement of the inverted strut 112 is limited by the jounce bumper 144. This movement of the damper piston 139 decreases the volume of the compression chamber 137 and increases the volume of the rebound chamber 140. In response to the changing volumes, strut fluid flows into the rebound chamber 140 from the external fluid control system through the lower opening 171 and rebound-chamber fluid connection 128. Conversely, strut fluid flows into the external fluid control system from the compression chamber 137 through the compression-chamber fluid connection 130. Dampening occurs through resistance to fluid movement provided by the external fluid control system.

Figure 5:
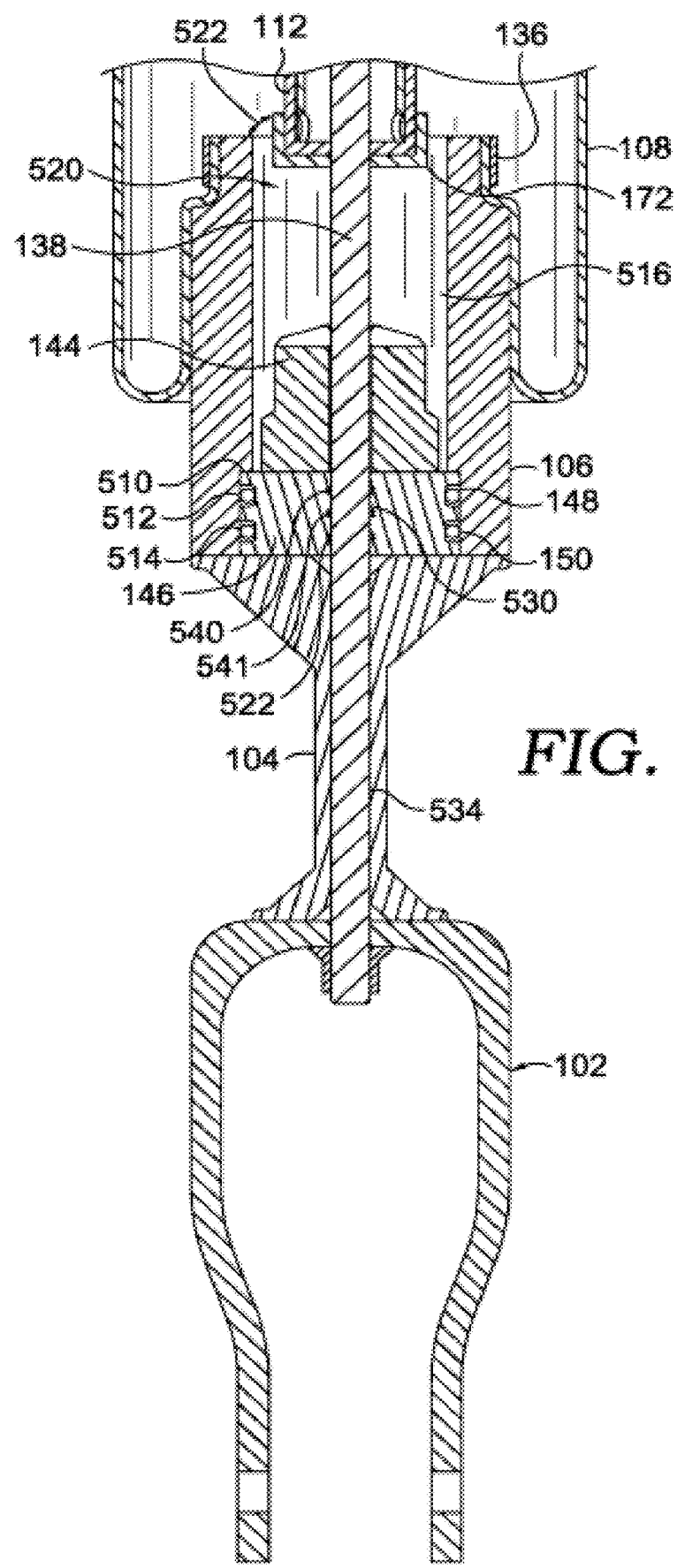
FIG. 5 is an enlarged view in cross-section of a lower strut/air spring connection, in accordance with various embodiments.

Turning now to FIG. 5, an enlarged view in cross-section of an inverted strut/air spring interface is provided in accordance with various embodiments. In the compressed position, the lower portion of the inverted strut 112 can fit into a cylindrical chamber 520 within the air spring piston 106. The cylindrical chamber 520 is formed by an interior surface 516 of the air spring piston 106. The exterior diameter of the inverted strut's bottom cap 172 is less than the interior diameter of the cylindrical chamber 520 creating a clearance 522 for the lower portion of the inverted strut 112 to fit into the cylindrical chamber 520. As mentioned, the compression of the air spring piston 106 and the inverted strut 112 may be arrested by the jounce bumper 144, which also fits within the cylindrical chamber 520.

During assembly of the air spring piston 106, the upper O-ring 148 may be fit into the upper groove 512 on the piston-sealing cap 146 and the lower O-ring 150 may be fit into the lower groove 514 on the piston-sealing cap 146. The strut rod 138 may be inserted through the opening 530 in the piston-sealing cap 146 and sealed with upper-interior O-ring 540, middle-interior O-ring 541, and lower-interior O-ring 542. The piston-sealing cap 146 may be compressed against the top of a notch 510 formed by the indentation in the lower interior surface of the air spring piston 106. The strut rod 138 may be inserted through the opening 534 in the spring seat support 104. The spring seat support 104 is then attached to the bottom of the air spring piston 106 using bolts, screws, or some other connection mechanism. The spring seat support 104 holds the piston-sealing cap 146 in place by compressing it against the top of the notch 510. The spring seat support 104 also holds the spring piston in place and transfers spring loads down to the clevis.

Figure 6:
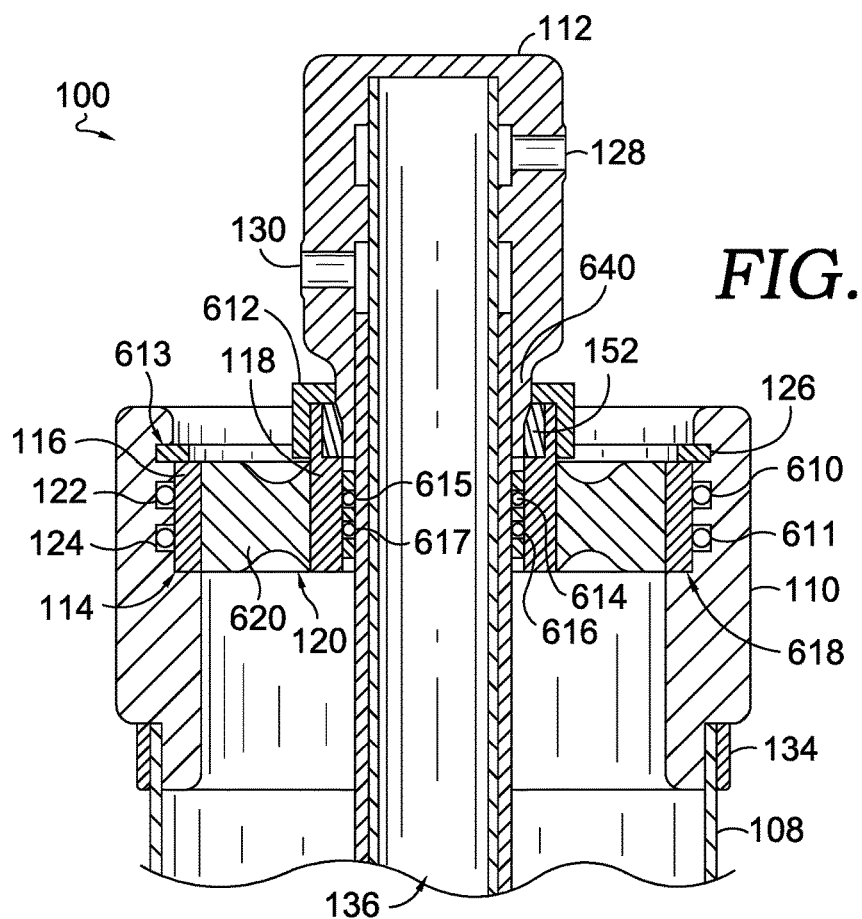
FIG. 6 is an enlarged view in cross-section of an upper strut/air spring connection, in accordance with various embodiments.

Turning now to FIG. 6, an enlarged view in cross-section of a sealing compliance bushing is provided in accordance with various embodiments. The sealing compliance bushing 120 comprises a compliance membrane 620 connected (e.g., bonded) to an outer cylinder 114 and an inner cylinder 118. The membrane 620, and sealing compliance bushing 120 as a whole, is selected to allow movement of the inverted strut 112 relative to the top mount housing 110 of the air spring 108. Different sealing compliance bushings may be developed based on vehicle characteristics and desired operating conditions (e.g., light duty, heavy duty, ride stiffness). Table 1, shown below, estimates bushing design parameters for different vehicles. Given the design parameters, an appropriate sealing compliance bushing 120 may be selected.

TABLE 1

| Vehicle Application | Truck | Compact | Full Size | Large Recreational ATV |
|---|---|---|---|---|
| Apprx Front GAWR [kg] | 1900 | 800 | 1360 | 300 |
| Maximum g loading | 3.5 | 3.5 | 3.5 | 4 |
| Maximum Vertical Wheel Force [N] | 32585 | 13720 | 23324 | 5880 |
| Suspension Strut Motion Ratio | 0.65 | 0.65 | 0.65 | 0.7 |
| Maximum Bushing Axial Force [N] | 50131 | 21108 | 35883 | 8400 |
| Conical Angle Capacity [+/−deg] | 6 | 3 | 4 | 8 |
| High Cycle Operating Pressure Differential [bar] | 5-15 | 3-12 | 4-13 | 2-10 |
| Low Cycle Operating Pressure Differential [bar] | 15-25 | 12-20 | 13-22 | 10-20 |
| Burst Pressure [bar] | >40 | >35 | >38 | >30 |
| Static Axial Stiffness Target @ +/−1 mm [N/mm] | 650 | | | |
| Static Radial Stiffness Target [N/mm] | >3000 | | | |
| Static Conical Stiffness Target [Nm/deg] | <4 | | | |

As used herein, a sealing compliance bushing comprises an interior cylinder connected to an exterior cylinder by a flexible membrane, wherein the flexible membrane, connection between the exterior cylinder and the flexible membrane, and connection between the interior cylinder and the flexible membrane are all substantially airtight.

The sealing compliance bushing 120 forms an airtight seal between the inverted strut 112 and top mount housing 110 of the air spring 108. In one implementation, during assembly, an upper O-ring 122 may be placed in the upper groove 610 located in the interior surface of the top mount housing 110. In one implementation, a lower O-ring 124 may be placed in the lower groove 611 located in the interior surface of the top mount housing 110. The O-ring sealing method is one option for accomplishing the static seals at the inner and outer cylinders of the bushing, though alternative methods may be used. For example, additionally or alternatively, a sealing surface (e.g., rubber coating) may be present on the exterior surface of the outer cylinder 114. The sealing compliance bushing 120 may then be installed such that the outer cylinder 114 rests on the ledge 618 in the top mount housing 110. The sealing compliance bushing 120 is held in place by snap ring 126 that fits into groove 613. As an alternative to the snap ring, a separate bolt-on plate could be used to lock in the bushing. This plate would secure the bushing's outer cylinder and provide a surface to act as hard stop for bushing compression. Use of other mechanical retainers is possible.

To help form the airtight seal between the exterior surface of the inverted strut 112 and the interior surface of the inner cylinder 118, an upper O-ring 614 may be installed in the upper groove 615 and a lower O-ring 616 may be installed in the lower groove 617. An attachment collar 612 is slid over the body of the inverted strut 112 until it fits snuggly against a protrusion 640 in the strut head 113. A collar sleeve 152 is then threaded onto the body of the inverted strut 112 and tightened to a sufficient torque value that causes the collar sleeve 152 to capture the attachment collar. The inverted strut 112 is then inserted through the opening in the sealing compliance bushing 120. The lower end of the attachment collar 612 threads onto an upper portion 660 of the inner cylinder 118 and pinches the inner cylinder 118 in place between the outer surface of the collar sleeve 152 and the inner surface of the attachment collar 612. Both the attachment collar 612 and collar sleeve 152 have generally cylindrical shapes.

Figure 7:
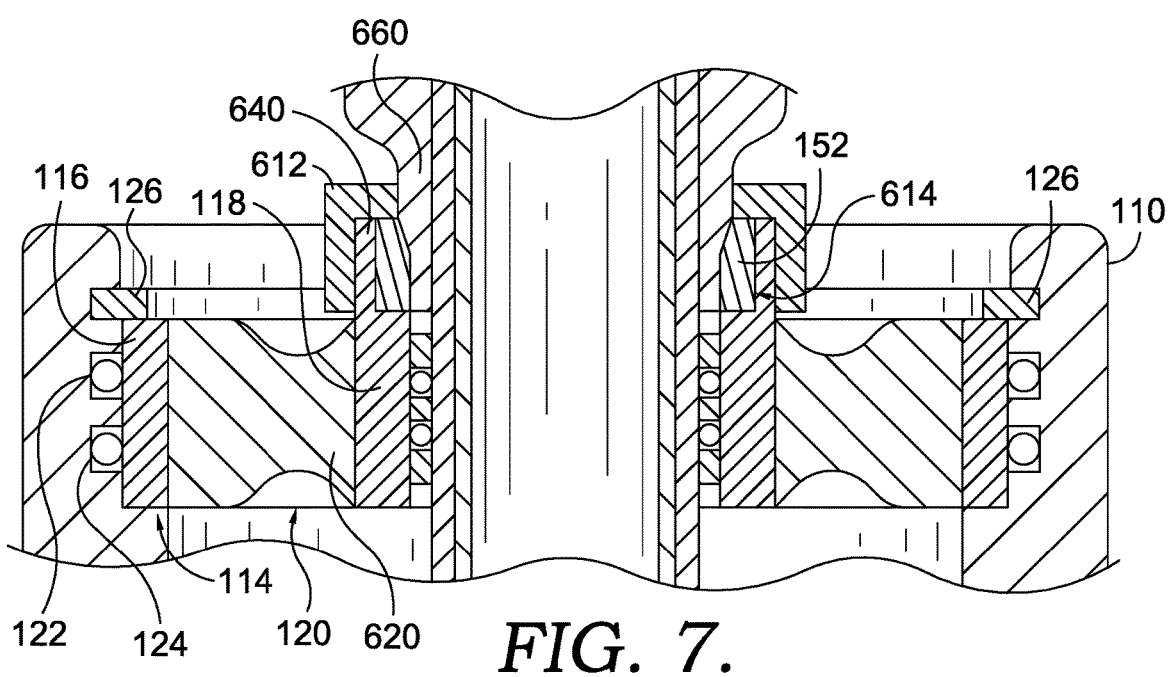
FIG. 7 is an enlarged view in cross-section of a sealing compliance bushing, in accordance with various embodiments.
Figure 8:
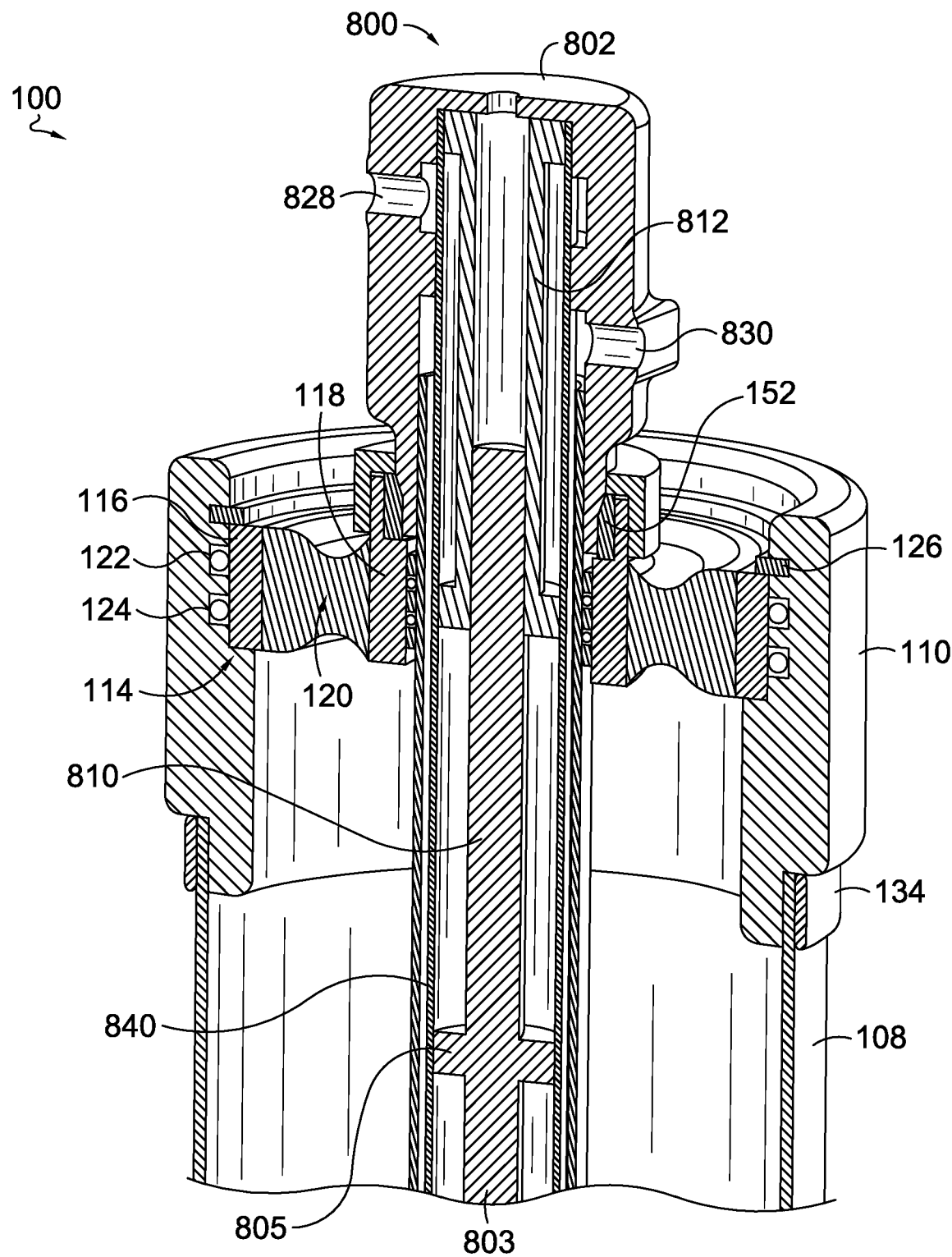
FIG. 8 is an enlarged view in cross-section of an upper strut/air spring connection in a thru-rod strut, in accordance with various embodiments.

Turning now to FIG. 7, an enlarged view in cross-section of a sealing compliance bushing is provided in accordance with various embodiments. The components shown in FIG. 7 have been described previously, with reference to FIG. 6.

Turning now to FIG. 8, an enlarged view in cross-section of an upper strut/air spring connection in a thru-rod strut 800 is provided in accordance with various embodiments. The thru-rod strut 800 includes an upper rod 810, piston head 805, and a lower rod 803. The inclusion of the upper rod 810 decreases the amount of fluid adjustment needed in the upper fluid chamber 840, which is above the piston head 805, because the need to account for displacement of the strut rod is reduced. The upper portion of the upper rod 810 moves within the rod sleeve 812, which forms a fluid-tight connection with the exterior of the rod. As the rod moves up and down, the pressure in the area above the rod is equalized as air moves through orifice 802.

The head of the thru-rod strut 800 includes fluid connections. The head includes a rebound-chamber fluid connection 828 and a compression-chamber fluid connection 830. The rebound-chamber fluid connection 828 allows fluid to flow through a line to and from the strut's rebound chamber and an external fluid control system. The compression-chamber fluid connection 830 allows fluid to flow through a line to and from the strut's compression chamber and the fluid control system.

Assembly Method

Figure 9:
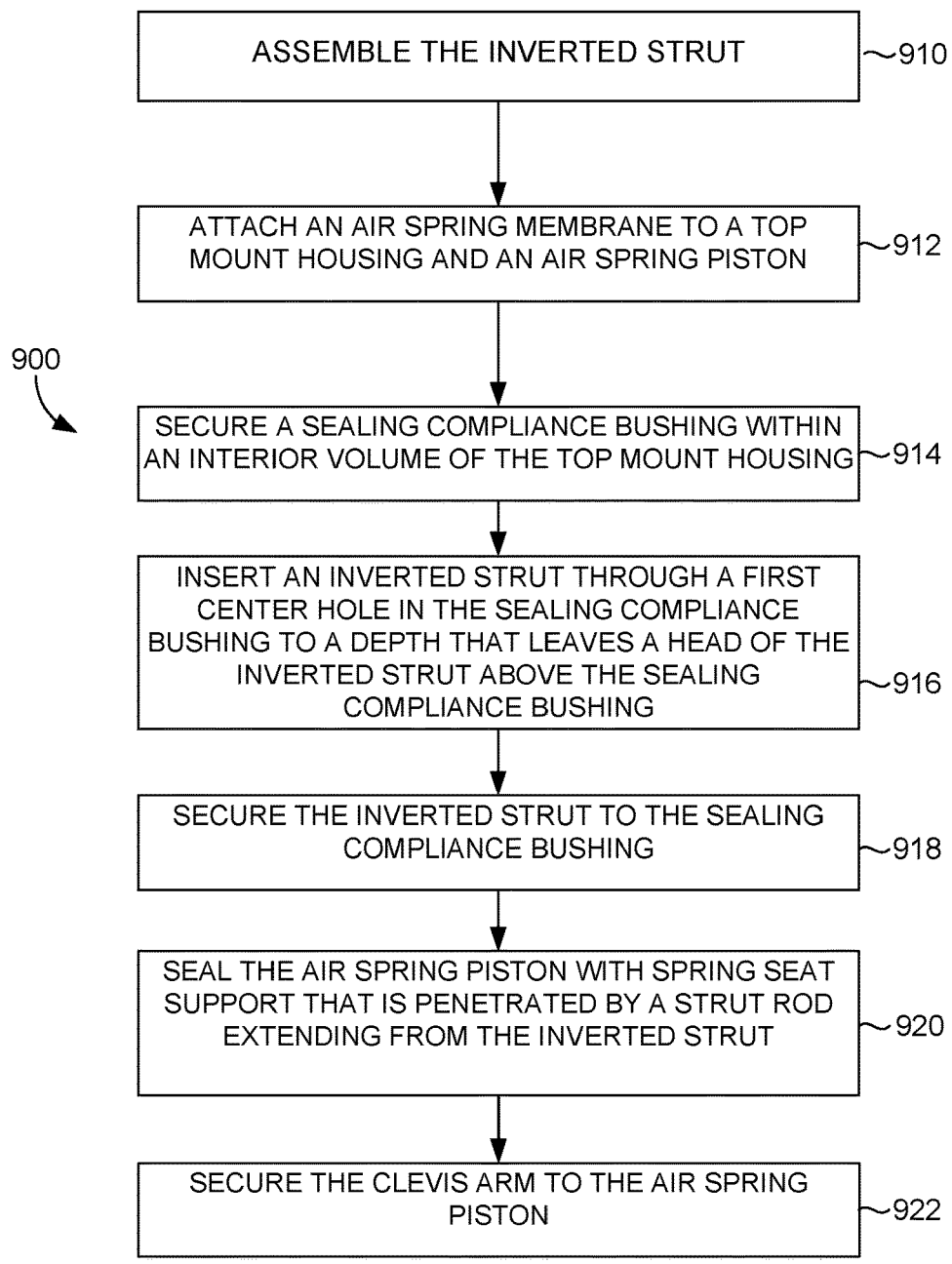
FIG. 9 is a flow chart showing a method of assembling an inverted air spring strut, in accordance with various embodiments.

Turning now to FIG. 9, a flow chart showing a method 900 of assembling the inverted air spring strut is provided, in accordance with embodiments of the technology described herein. Other methods of assembly are possible using more or less steps or a different order of steps. The method 900 includes, at step 910, assembling the inverted strut 112. At a high level, the inverted strut 112 may be assembled by inserting the top end of interior cylinder 175 in a first grove in the strut head 113. The interior cylinder 175 may be open on both ends. The strut rod 138 with attached piston may be inserted into the interior of the interior cylinder 175. Next, the exterior cylinder 174 may be slid over the interior cylinder 175 and a top end of the into exterior cylinder 174 fit into a second groove in the strut head 113. The exterior cylinder 174 may be open at the top, but have an enclosed bottom end with an opening for the strut rod 138. A bottom cap with a strut-rod opening may be slid over the strut rod and then attached to the exterior cylinder 174 and/or interior cylinder 175.

The method 900 includes, at step 912 attaching an air spring membrane to a top mount housing and an air spring piston. In an aspect, the air spring membrane is crimped to the exterior surface of the top mount housing 110. In an aspect, the air spring membrane is crimped to the exterior surface of the air spring piston 106.

The method 900 includes, at step 914, securing a sealing compliance bushing within an interior volume of the top mount housing. In an aspect, a snap ring 126 is used to secure the sealing compliance bushing. The snap ring fits partially into a groove 613 within the interior surface of the top mount housing 110. As an alternative to the snap ring, a separate bolt-on plate could be used to lock in the bushing. This plate would secure the bushing's outer cylinder and provide a surface to act as hard stop for bushing compression. Use of other mechanical retainers is possible. Prior to securing the sealing compliance bushing, upper and lower O-rings are placed into upper and lower grooves in the top mount housing 110. The sealing compliance bushing 120 is then pressed into the top mount housing 110 against the top of a perpendicular ledge formed by a decreased interior diameter of the top mount housing 110. The sealing compliance bushing 120 is then secured, as described.

The method 900 includes, at step 916 inserting an inverted strut through a first center hole in the sealing compliance bushing to a depth that leaves a head of the inverted strut above the sealing compliance bushing. Prior to insertion, an attachment collar may be slid over the exterior of the exterior cylinder 174 and against a protrusion in the strut head. The attachment collar may have an upside-down L-shaped cross section. The attachment collar may comprise a cylindrical ring with a vertical body and a horizontal flange extending towards an interior of the attachment collar. The interior diameter of a circle formed by the horizontal flange is larger than the diameter of the inverted strut body, but smaller than the diameter of the protrusion from the strut head. Next, a collar sleeve is threaded onto threads located on the exterior of the inverted damper. The collar sleeve is tightened to secure the attachment collar in place.

The method 900 includes, at step 918 securing the inverted strut to the sealing compliance bushing. In an aspect, an attachment collar is used to secure the inverted strut. The attachment collar 612 is threaded onto the inner cylinder 118 of the sealing compliance bushing 120 to secure the inverted strut to the inner cylinder.

The method 900 includes, at step 920 sealing the air spring piston with spring seat support that is penetrated by a strut rod extending from the inverted strut. A jounce bumper is slid over the strut rod 138 and into the air spring piston 106. The piston-sealing cap 146 is pressed into the air spring piston 106 with upper and lower O-rings installed first. The spring seat support is then slid over the strut rod 138 and attached to the air spring piston using two or more screws, or other attachment mechanism.

The method 900 includes, at step 922 securing the clevis arm to the air spring piston. In an aspect, the clevis arm is slid onto a portion of the strut rod extending from the spring seat support 104 and secured with a nut.

EMBODIMENTS

Embodiment 1. An inverted air spring strut assembly comprising: an air spring including a top mount housing, an air spring piston, and an air spring membrane; a sealing compliance bushing coupled to the top mount housing of the air spring; a strut including a strut head and a bottom cap; and a strut rod extending from the strut; wherein the air spring encloses a portion of the strut, the strut head passes through the sealing compliance bushing and the top mount housing, and the strut rod passes through a bottom the bottom cap of the strut and the air spring piston.

Embodiment 2. The inverted air spring strut assembly of embodiment 1, wherein the strut head includes a rebound-chamber fluid connection.

Embodiment 3. The inverted air spring strut assembly of embodiment 1, wherein the strut head includes a compression-chamber fluid connection.

Embodiment 4. The inverted air spring strut assembly of embodiment 1, further comprising a spring seat support coupled between the air spring piston and a clevis joint, wherein the strut rod further passes through the spring seat support.

Embodiment 5. The inverted air spring strut assembly of embodiment 1, wherein the sealing compliance bushing is mounted to an interior surface of the top mount housing and an outside surface of the strut.

Embodiment 6. The inverted air spring strut assembly of embodiment 4, wherein the sealing compliance bushing forms a top seal of an air chamber formed by the air spring membrane.

Embodiment 7. The inverted air spring strut assembly of embodiment 4, wherein the sealing compliance bushing has an amount of flexibility that allows the strut to move at least 5 mm relative to the top mount housing.

Embodiment 8. The inverted air spring strut assembly of embodiment 4, further comprising an attachment component installed above the sealing compliance bushing to secure the sealing compliance bushing within the top mount housing.

Embodiment 9. An inverted air spring strut assembly of a vehicle comprising: an air spring including a top mount housing, an air spring piston, and an air spring membrane; a sealing compliance bushing coupled to the top mount housing of the air spring; a strut including a strut head; a strut rod extending from the strut; wherein the air spring encloses a portion of the strut, the strut head passes through the sealing compliance bushing and the top mount housing, and the strut rod passes through the air spring piston.

Embodiment 10. The inverted air spring strut assembly of embodiment 9, wherein the strut head includes a rebound-chamber fluid connection.

Embodiment 11. The inverted air spring strut assembly of embodiment 10, wherein the strut head includes a compression-chamber fluid connection.

Embodiment 12. The inverted air spring strut assembly of embodiment 9, further comprising a mechanical retainer installed above the sealing compliance bushing to secure the sealing compliance bushing to the top mount housing.

Embodiment 13. The inverted air spring strut assembly of embodiment 9, wherein the sealing compliance bushing forms a top seal of an air chamber formed by the air spring membrane.

Embodiment 14. The inverted air spring strut assembly of embodiment 11, wherein the strut includes exterior threads for a collar sleeve that fixes an attachment collar in place, wherein the attachment collar attaches the strut to the sealing compliance bushing.

Embodiment 15. A method of assembling an inverted air spring strut comprising: attaching an air spring membrane to a top mount housing and an air spring piston; securing a sealing compliance bushing within an interior volume of the top mount housing; inserting an inverted strut through a first center hole in the sealing compliance bushing to a depth that leaves a head of the inverted strut above the sealing compliance bushing; securing the inverted strut to the sealing compliance bushing; sealing the air spring piston with spring seat support that is penetrated by a strut rod extending from the inverted strut; and securing a clevis arm to the air spring piston.

Embodiment 16. The method of embodiment 15, further comprising a mechanical retainer installed above the sealing compliance bushing to secure the sealing compliance bushing to the top mount housing.

Embodiment 17. The method of embodiment 15, further comprising inserting the strut rod through a second center hole in the air spring piston.

Embodiment 18. The method of embodiment 15, further comprising torquing a collar sleeve on to threads located on an exterior of the inverted strut until an attachment collar in secured against a ridge in a strut head.

Embodiment 19. The method of embodiment 15, further comprising installing the inverted air spring strut on a vehicle with the strut rod pointing toward a driving surface Embodiment 20. The method of embodiment 19, wherein the clevis arm is attached to a lower suspension control arm of the vehicle.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure. For example, the fluid lines or fittings described can be configured for use in various other components including, but not limited to, plumbing systems or other piping systems. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. An inverted air spring strut assembly comprising:
   an air spring including a top mount housing, an air spring piston, and an air spring membrane;
   a sealing compliance bushing coupled to the top mount housing of the air spring, wherein the sealing compliance bushing has an amount of flexibility that allows a strut to move at least 5 mm relative to the top mount housing;
   the strut including a strut head and a bottom cap; and
   a strut rod extending from the strut; wherein
   the air spring encloses a portion of the strut, the strut head passes through the sealing compliance bushing and the top mount housing, and the strut rod passes through a bottom of the bottom cap of the strut and the air spring piston.

2. The inverted air spring strut assembly of claim 1, wherein the strut head includes a rebound-chamber fluid connection.

3. The inverted air spring strut assembly of claim 1, wherein the strut head includes a compression-chamber fluid connection.

4. The inverted air spring strut assembly of claim 1, further comprising a spring seat support coupled between the air spring piston and a clevis joint, wherein the strut rod further passes through the spring seat support.

5. The inverted air spring strut assembly of claim 4, wherein the sealing compliance bushing forms a top seal of an air chamber formed by the air spring membrane.

6. The inverted air spring strut assembly of claim 4, further comprising an attachment component installed above the sealing compliance bushing to secure the sealing compliance bushing within the top mount housing.

7. The inverted air spring strut assembly of claim 1, wherein the sealing compliance bushing is mounted to an interior surface of the top mount housing and an outside surface of the strut.

8. An inverted air spring strut assembly of a vehicle comprising:
   an air spring including a top mount housing, an air spring piston, and an air spring membrane;
   a sealing compliance bushing coupled to the top mount housing of the air spring, wherein the sealing compliance bushing has an amount of flexibility that allows a strut to move at least 5 mm relative to the top mount housing;
   the strut including a strut head;
   a strut rod extending from the strut; wherein
   the air spring encloses a portion of the strut, the strut head passes through the sealing compliance bushing and the top mount housing, and the strut rod passes through the air spring piston.

9. The inverted air spring strut assembly of claim 8, wherein the strut head includes a rebound-chamber fluid connection.

10. The inverted air spring strut assembly of claim 9, wherein the strut head includes a compression-chamber fluid connection.

11. The inverted air spring strut assembly of claim 10, wherein the strut includes exterior threads for a collar sleeve that fixes an attachment collar in place, wherein the attachment collar attaches the strut to the sealing compliance bushing.

12. The inverted air spring strut assembly of claim 8, further comprising a mechanical retainer installed above the sealing compliance bushing to secure the sealing compliance bushing to the top mount housing.

13. The inverted air spring strut assembly of claim 8, wherein the sealing compliance bushing forms a top seal of an air chamber formed by the air spring membrane.

14. A method of assembling an inverted air spring strut comprising:
   attaching an air spring membrane to a top mount housing and an air spring piston;
   securing a sealing compliance bushing within an interior volume of the top mount housing;
   torquing a collar sleeve on to threads located on an exterior of an inverted strut until an attachment collar is secured against a ridge in a strut head;
   inserting the inverted strut through a first center hole in the sealing compliance bushing to a depth that leaves a head of the inverted strut above the sealing compliance bushing;
   securing the inverted strut to the sealing compliance bushing;
   sealing the air spring piston with spring seat support that is penetrated by a strut rod extending from the inverted strut; and
   securing a clevis arm to the air spring piston.

15. The method of claim 14, further comprising a mechanical retainer installed above the sealing compliance bushing to secure the sealing compliance bushing to the top mount housing.

16. The method of claim 14, further comprising inserting the strut rod through a second center hole in the air spring piston.

17. The method of claim 14, further comprising installing the inverted air spring strut on a vehicle with the strut rod pointing toward a driving surface.

18. The method of claim 17, wherein the clevis arm is attached to a lower suspension control arm of the vehicle.

* * * * *